Nov. 29, 1927.
T. APPLEBY
1,651,012
METHOD OF AND APPARATUS FOR PRODUCING OSCILLATIONS
Filed May 4, 1921
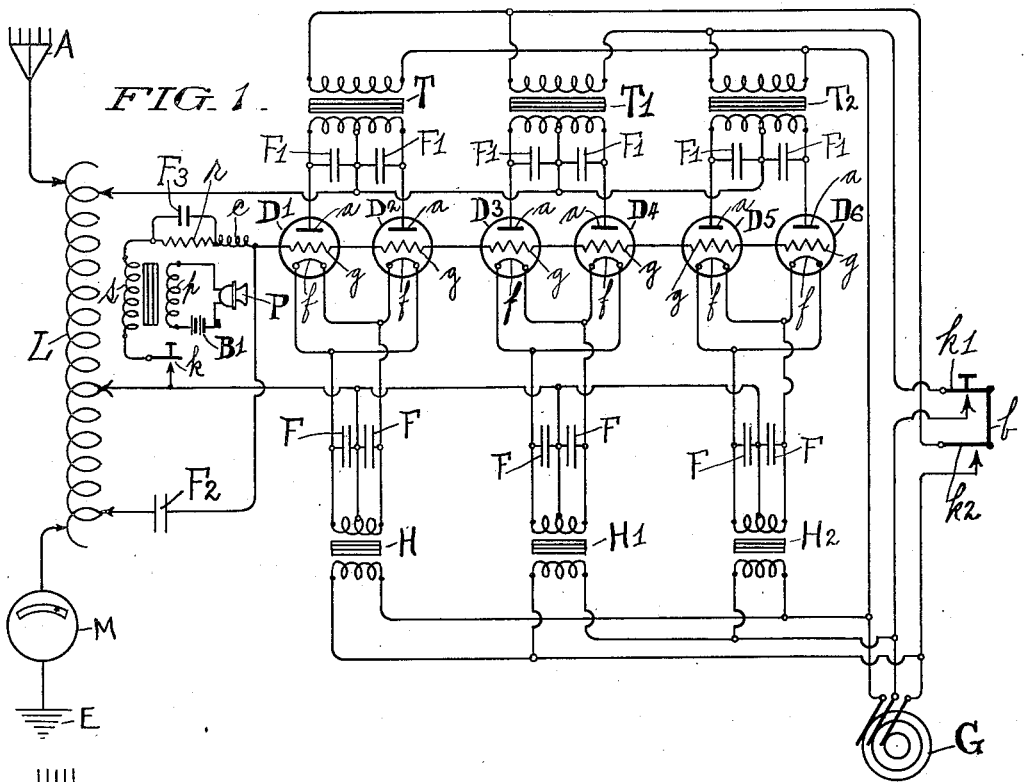
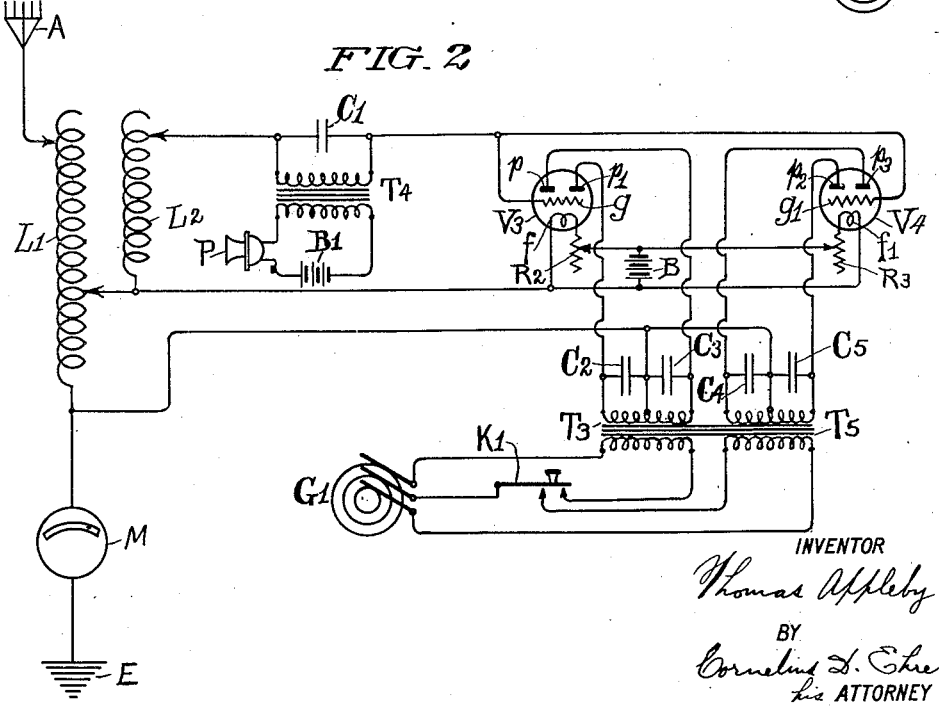
INVENTOR
Thomas Appleby
BY
Cornelius D. Ehret
his ATTORNEY Patented Nov. 29, 1927.

1,651,012

UNITED STATES PATENT OFFICE.

THOMAS APPLEBY, OF PHILADELPHIA, PENNSYLVANIA, ASSIGNOR, BY DIRECT AND MESNE ASSIGNMENTS, TO ARTHUR ATWATER KENT, OF ARDMORE, PENNSYLVANIA.

METHOD OF AND APPARATUS FOR PRODUCING OSCILLATIONS.

Application filed May 4, 1921. Serial No. 466,733.

My invention relates to a method of and apparatus for producing from polyphase current electrical oscillations, more particularly high frequency oscillations utilizable for any suitable purpose, such as telegraphy, telephony or other signaling in radio systems, or in carrier wave systems employing one or more conductors extending between transmitting and receiving stations.

My invention resides in the method and apparatus hereinafter described and claimed.

For an understanding of my method, and for an illustration of some of the arrangements my apparatus may take, reference is to be had to the accompanying drawing, in which:

Fig. 1 is a diagrammatic view of apparatus embodying my invention and suitable for carrying out my method.

Fig. 2 is a diagrammatic view of a modification.

Referring to Fig. 1, G represents a source of polyphase current, the number of phases being two or more, and in the example illustrated three phases, it being understood that any suitable greater number of phases is comprehended within my invention. The frequency of the polyphase current may be anything suitable or desirable, for example, a commercial frequency, as 60 cycles per second; it will be understood, however, that higher frequency current may be employed, as for example, of 500 cycles or upwards per second. Across the different phases of the source G are connected the primaries of preferably step-down transformers H, H$^1$ and H$^2$ for delivering current for heating the cathodes or filaments $f$ of thermionic devices D$^1$, D$^2$, D$^3$, D$^4$, D$^5$ and D$^6$, these devices comprising bulbs or tubes evacuated to any suitable degree and containing in addition to the aforesaid filaments $f$ the plates or anodes $a$ and grids or control electrodes $g$. In the example illustrated there is a pair of thermionic devices for each phase of the source G, and the filaments of those devices are heated by current from the same phase.

The filaments of each pair of thermionic devices are bridged across the secondary of the corresponding transformer H, H$^1$ or H$^2$; and across the terminals of each such transformer secondary are serially connected condensers F, F. From substantially the mid point of each of such transformer secondaries connection is made from a point between corresponding condensers F, F to a variable point upon the inductance L. Connected across the different phases of the source G are the preferably step-up transformers T, T$^1$ and T$^2$, the terminals of each of whose secondaries are connected to the anodes $a$ of a corresponding pair of the aforesaid thermionic devices. Bridged across the terminals of each of these secondaries are the serially connected condensers F$^1$, F$^1$, and from a point between each pair of condensers a connection is made from substantially the mid point of the associated transformer secondary and to a point upon the aforesaid inductance L. The grids $g$ are connected through the condenser F$^2$ with another point upon the inductance L and also through the radio frequency choke coil $c$ and the grid leak resistance $r$, shunted by a condenser F$^3$, with one terminal of the secondary $s$ of a transformer, the other terminal of the secondary $s$ connecting through the switch or key $k$ with the filaments $f$. Inductively related to the secondary $s$ is the primary $p$, in circuit with which is a battery B$^1$ and a microphone or other signaling instrument P. Between the source G and the primaries of the transformers T, T$^1$ and T$^2$ are serially related the keys $k^1$ and $k^2$ movable in unison through the interconnecting member $b$ of insulating material. The inductance L is connected between the antena or radiating conductor A and the earth or counter-capacity E, a meter M being disposed in the antenna path if desired.

From the circuits described it will be apparent that the thermionic devices are connected as thermionic oscillation producers, there being effected a coupling between the anode and grid circuits through the inductance L.

The operation is as follows:

When the keys $k^1$ and $k^2$ are closed, the primaries of the three transformers T, T$^1$ and T$^2$ will be energized, and the two thermionic devices of each pair alternately select energy corresponding with current waves of opposite sign of one phase, and convert such energy into high frequency oscillations which are impressed upon the antenna path. This same operation occurs for each phase, whereby there are produced overlapping groups or trains of undamped waves or oscillations whose energy is radiated from the antenna structure A to a distant receiving station.

For telegraphy the keys $k^1$, $k^2$ are manipulated simultaneously in accord with a telegraphic code.

Or with the keys $k^1$ and $k^2$ held closed, and with the switch or key $k$ closed, upon speaking into the microphone P the potential of the grids $g$ will be varied in accordance with speech, causing corresponding modulation of the oscillations and the radiant energy.

Or with the keys $k^1$ and $k^2$ closed, by manipulating the key $k$ telegraphic messages may be transmitted.

Referring to Fig. 2, a generally similar arrangement is indicated. The generator $G^1$ produces polyphase current, in this example quarter phase or two phase current, supplying energy through the telegraph key $K^1$ through the primaries of the transformers $T^3$, $T^5$, with which are associated, respectively, the condensers $C^2$, $C^3$ and $C^4$, $C^5$, the first pair of condensers cooperating with the circuits of the plates $p$ and $p^1$ of the thermionic bulb $V^3$, while the second pair cooperates with the circuits of the plates $p^2$ and $p^3$ of the second thermionic bulb $V^4$. The plate circuits of each bulb are coupled through $L^1$ and $L^2$ to their grid circuits, and the oscillations produced, as described in connection with Fig. 1, are impressed upon the antenna A or other circuit or path including the inductance $L^1$. In this case the filaments $f$ and $f^1$ are supplied by steady current from the battery B, the currents through the filaments being controlled, respectively, by the adjustable resistances $R^2$ and $R^3$. It will be understood, however, that the heating current for these filaments may be supplied as in Fig. 1 by the generator $G^1$.

If the key $K^1$ is held closed, speech may be transmitted, because of the overlapping series of oscillations due to the two phases of the generator $G^1$. Speech or sound waves impinge upon the microphone P connected in the primary circuit of the transformer $T^4$ together with the battery $B^1$. The secondary of the transformer $T^4$, shunted by the condenser $C^1$, modulates the potentials of the grids $g$ and $g^1$. When the frequency of the generator $G^1$ is low, a sound may be heard in the usual receiving telephone in the receiving station, but speech is also distinguishable. The apparatus is more suitable for telephony as the frequency of the generator $G^1$ is increased.

In Fig. 2 again the alternating current, in each phase of generator $G^1$, is rectified and converted into oscillations of any desired or suitable frequency.

In Fig. 2 it will be noted that the two anodes for each phase of the supply current are disposed within one and the same evacuated vessel, which arrangement it will be understood may be utilized also in connection with Fig. 1.

Of both figures it will be understood that any number of evacuated vessels may be used; for example, all the anodes may be disposed in one evacuated chamber, with grid and cathode structure, and in general, the number of anodes per bulb or chamber may be anything suitable or desirable.

As to both figures, it will be understood that the voltage delivered by the secondaries of the transformers T, $T^1$ or $T^2$ may be anything suitable or desired, and in general, such voltage as to suit the vacuum tube or tubes of the oscillation-producing means. For example, the secondary voltage may range upwardly to thousands of volts, and may be, for example, of the order of 10,000 volts or higher for high powered thermionic oscillators. And the primary voltage, that is, the voltage of the source G, may be anything suitable or desired, as for example, a commercial voltage such as 110 or 220 volts.

While in the foregoing description I have set forth radio transmitting apparatus, it will be understood that the oscillations produced may be impressed upon a line conductor or line conductors extending between transmitting and receiving stations; in such case the antenna station A represents such a conductor system, though the mode of transfer of the oscillations to the conductor or conductors may be anything suitable or desirable.

From the foregoing description it is apparent that the polyphase alternating current is in effect rectified within the thermionic device or devices, and is not rectified by additional or external means. Within the common anode circuit are produced overlapping uni-directional current impulses having an envelope having periodic small amplitude variation; the energy is converted into oscillations in a common oscillation-producing circuit or arrangement whereby continuous or undamped waves or oscillations are produced whose normal envelope corresponds with the envelope of the overlapping uni-directional impulses or waves impressed upon the anode circuit.

It will be understood that my invention is not limited to the particular circuit arrangements or connections, nor is it limited as regards the voltages or number of phases employed.

This application is a continuation in part of my prior application Serial No. 276,532, filed February 12, 1919.

What I claim is:

1. The method of producing oscillations of high frequency by thermionic means comprising anode, cathode and control electrode structures with connections forming anode and control electrode circuits, which consists in generating polyphase alternating current, delivering in succession and uni-directionally to said anode circuit overlapping half waves of said polyphase current, and varying the potential impressed upon the control electrode circuit at said high frequency and at sound wave frequency.

2. The method of producing oscillations by thermionic means comprising a plurality of asymmetrical thermionic impedances formed between anode and cathode structures, associated control electrode structure, and connections forming anode and control electrode circuits, which consists in generating polyphase alternating current, selecting from the different phases current waves by said impedances to effect a succession of uni-directional impulses, and periodically varying the potential impressed upon a control electrode circuit at a frequency independent of the frequency of said polyphase current.

3. The method of producing oscillations by thermionic means comprising a plurality of pairs of asymmetrical thermionic impedances formed between anode and cathode structures, associated control electrode structure, and connections forming anode and control electrode circuits, which consists in generating polyphase alternating current, selecting by each of said pairs of impedances the positive and negative current waves of one of the phases of said polyphase current to effect a succession of uni-directional impulses, and periodically varying the potential impressed upon a control electrode circuit at a frequency independent of the frequency of said polyphase current.

4. Apparatus for producing oscillations comprising a source of polyphase alternating current, thermionic oscillation-producing means comprising a plurality of anodes with associated grid and cathode structures, means for coupling the anode and grid circuits, and means for delivering energy of the current waves of different signs from each of the different phases to said anodes, said thermionic devices simultaneously selecting energy from said source and converting it into oscillations.

5. Apparatus for producing oscillations comprising a source of polyphase alternating current, a pair of anodes for each phase, a symmetrically conducting connection from each anode to a terminal of each phase, grid and cathode structures associated with said anodes, and a coupling between the anode and grid circuits for producing oscillations.

6. Apparatus for producing oscillations comprising a source of polyphase alternating current, a pair of anodes for each phase, the anodes of each phase being connected, respectively, with opposite terminals of the phase through symmetrically conducting paths, condensers connected in series with each other between the anodes of each phase, cathode and grid structures associated with said anodes, a connection from a point between the condensers for each phase to a common anode circuit, and a coupling between said anode circuit and the grid circuit for producing oscillations.

7. Apparatus for producing oscillations comprising a source of polyphase alternating current, a pair of anodes for each phase, the anodes of each phase being connected, respectively, with opposite terminals of the phase through symmetrically conducting paths, condensers connected in series with each other between the anodes of each phase, cathode and filament structures associated with said anodes, a connection from a point between the condensers for each phase to a common anode circuit, a connection from the filament terminals to each phase, condensers connected in series with each other across the filament, a connection from a point between said last named condensers to the grid and anode circuits, and a coupling between the anode and grid circuits for producing oscillations.

8. Apparatus for producing oscillations comprising a source of polyphase alternating current, thermionic oscillation-producing means comprising a plurality of anodes with associated grid and cathode structures, an anode circuit to which said anodes are common, a grid circuit coupled to said anode circuit, and means for delivering current waves of both signs from the different phases to said anodes.

9. Apparatus for producing oscillations comprising a source of polyphase alternating current, a pair of anodes for each phase, a symmetrically conducting connection from each anode to a terminal of each phase, grid and cathode structures associated with said anodes, an anode circuit to which said pairs of anodes are common, and a grid circuit coupled to said anode circuit for producing oscillations from the current waves of both signs from each phase.

10. Apparatus for producing oscillations comprising a source of polyphase alternating current, a pair of anodes for each phase, the anodes of each phase being connected, respectively, with opposite terminals of the phase through symmetrically conducting paths, condensers connected in series with each other between the anodes of each phase, cathode and grid structures associated with said anodes, a connection from a point between the condensers for each phase to a common anode circuit, a coupling between said anode circuit and the grid circuit for producing oscillations, and telephonic means for varying the potential of the grid structure.

11. Apparatus for producing oscillations comprising a source of polyphase alternating current, a pair of anodes for each phase, the anodes of each phase being connected, respectively, with opposite terminals of the phase through symmetrically conducting paths, condensers connected in series with each other between the anodes of each phase, cathode and filament structures associated with said anodes, a connection from a point between the condensers for each phase to a common anode circuit, a connection from the filament terminals to each phase, condensers connected in series with each other across the filament, a connection from a point between said last named condensers to the grid and anode circuits, a coupling between the anode and grid circuits for producing oscillations, and telephonic means for varying the potential of the grid circuit.

12. The combination with a source of polyphase alternating current, of a pair of thermionic oscillators for each phase and each comprising an asymmetrical impedance, the impedances of each pair selecting, respectively, energy of positive and negative current waves from one phase.

13. The combination with a source of polyphase alternating current, of a pair of thermionic oscillators for each phase and each comprising an asymmetrical impedance, the impedances of each pair selecting, respectively, energy of positive and negative current waves from one phase, and means for simultaneously controlling the oscillations produced by the energy from all phases in accordance with speech.

14. The combination with a radiating structure, of an inductance associated therewith in energy-transfer relation, a source of polyphase alternating current, an asymmetrical thermionic impedance associated with each phase and having anode and cathode structures, a circuit including a portion of said inductance extending from said anode structures to the cathode structure and constituting an anode circuit, control electrode structure for each of said impedances, and a connection from said control electrode structure to said cathode structure and including a portion of said inductance in a control electrode circuit.

15. The combination with a radiating structure, of an inductance associated therewith in energy-transfer relation, a source of polyphase alternating current, a pair of asymmetrical thermionic impedances associated with opposite terminals of each phase and having anode and cathode structures, a circuit including a portion of said inductance extending from said anode structures to the cathode structure and constituting an anode circuit, control electrode structure of said impedances, and a connection from said control electrode structure to said cathode structure and including a portion of said inductance in a control electrode circuit.

16. The combination with a radiating structure, of an inductance associated therewith in energy-transfer relation, a source of polyphase alternating current, an asymmetrical thermionic impedance associated with each phase and having anode and cathode structures, a circuit including a portion of said inductance extending from said anode structures to the cathode structure and constituting an anode circuit, control electrode structure of said impedances, a connection from said control electrode structure to said cathode structure and including a portion of said inductance in a control electrode circuit, and means for independently varying the potential of said control electrode structure connected in a path in parallel with the path including said second named portion of said inductance.

17. The method of controlling and operating thermionic means comprising anode, cathode and control electrode structures with connections forming anode and control electrode circuits, which comprises generating polyphase alternating current, delivering in succession and uni-directionally in said anode circuit overlapping half waves of said polyphase current selected by the asymmetrical thermionic impedance between said anode and cathode structures, and impressing upon the control electrode structure a potential varying at high and audio frequencies.

18. The method of controlling and operating thermionic means comprising a plurality of asymmetrical thermionic impedances formed between anode and cathode structures, associated control electrode structure, and connections forming anode and control electrode circuits, which comprises generating polyphase alternating current, selecting by said impedances from each of the different phases current waves of both signs to effect in an anode circuit a succession of uni-directional overlapping impulses, and impressing upon the control electrode structure a potential varying at high and audio frequencies.

19. The combination with a plurality of asymmetrical thermionic impedances formed between anode and cathode structures, of associated control electrode structure, connections forming anode and control electrode circuits, a source of polyphase alternating current, means for connecting one of said impedances in each phase of said source, and a signaling instrument common to and controlling said impedances.

20. The combination with a plurality of asymmetrical thermionic impedances formed between anode and cathode structures, of associated control electrode structure, connections forming anode and control electrode circuits, a source of polyphase alternating current, means for connecting one of said impedances in each phase of said source, and means for varying the potential of the cathode structure at high and audio frequencies.

21. The combination with a plurality of asymmetrical thermionic impedances formed between anode and cathode structures, of associated control electrode structure, connections forming anode and control electrode circuits, a source of polyphase alternating current, means for connecting a pair of said impedances in each phase of said source for respectively selecting therefrom the current waves of opposite signs, and a signaling instrument common to and controlling said impedances.

22. The combination with a plurality of asymmetrical thermionic impedances formed between anode and cathode structures, of associated control electrode structure, connections forming anode and control electrode circuits, a source of polyphase alternating current, means for connecting a pair of said impedances in each phase of said source for respectively selecting therefrom the current waves of opposite signs, and means for varying the potential of the cathode structure at high and audio frequencies.

23. The combination with a source of polyphase alternating current, of a pair of asymmetrically conducting thermionic impedances associated with each phase of said source and comprising a plurality of anodes and associated cathode structure, a connection from each terminal of a phase to one of the anodes associated therewith, a pair of condensers connected in series with each other between said anodes, a connection from a mid-point of each phase to a point between said condensers and to the anode-cathode circuit, and control electrode structure controlling the magnitudes of said impedances.

24. The combination with a source of polyphase alternating current, of a pair of asymmetrically conducting thermionic impedances associated with each phase of said source and comprising a plurality of anodes and associated cathode structure, a connection from each terminal of a phase to one of the anodes associated therewith, a pair of condensers connected in series with each other between said anodes, a connection from a mid-point of each phase to a point between said condensers and to the anode-cathode circuit, control electrode structure controlling the magnitudes of said impedances, and means for varying the potential of said control electrode structure in accord with a signal.

25. The combination with a source of polyphase alternating current, of a pair of asymmetrically conducting thermionic impedances associated with each phase of said source and comprising a plurality of anodes and associated cathode structure, a connection from each terminal of a phase to one of the anodes associated therewith, a pair of condensers connected in series with each other between said anodes, a connection from a mid-point of each phase to a point between said condensers and to the anode-cathode circuit, control electrode structure controlling the magnitudes of said impedances, and means for controlling the potential of said control electrode structure at radio and audio frequencies.

26. The combination with a source of polyphase alternating current, of a pair of asymmetrically conducting thermionic impedances associated with each phase of said source and selecting from said phase the positive and negative half waves, respectively, and comprising a plurality of anodes and associated cathode structure, and means for electrically heating the cathode structures of the several thermionic impedances by current from said source.

27. The combination with a source of polyphase alternating current, of a pair of asymmetrically conducting thermionic impedances associated with each phase of said source and selecting from said phase the positive and negative half waves, respectively, and comprising a plurality of anodes and associated cathode structure, and means for electrically heating the cathode structures of the different pairs of thermionic impedances by current from the different phases of said source.

28. In a wireless transmission system, the combination with a polyphase power source, of a plurality of oscillation-generator systems, said systems being oppositely connected in pairs to the respective phases of said polyphase source, and a circuit associated with all of said pairs of oscillation-generator systems and adapted to be energized thereby.

29. In a wireless transmission system, a plurality of pairs of oscillation generators, each pair of oscillation generators having output circuits, said output circuits in each pair having a common conductor and being oppositely associated therewith, a polyphase source of energy to provide one phase for each pair of oscillation generators, said phase being operatively connected to said common conductor, and a radiating circuit operatively associated to said oscillation generator systems and adapted to be energized thereby.

30. In a wireless transmission system, a plurality of pairs of vacuum-tube oscillation generators, each pair of vacuum tubes having output circuits, said output circuits having a common conductor and being oppositely associated therewith, a polyphase source of energy to provide one phase for each pair of oscillation generators, each phase being connected to said common conductor, and a radiating circuit operatively associated with said oscillation-generator systems and adapted to be energized thereby.

31. In a wireless transmission system, a polyphase source of energy, a plurality of pairs of vacuum-tube oscillation generators, one for each phase, each pair of oscillation generators being so connected as to utilize both half waves of the impressed electromotive force, and a radiating system operatively associated with said pairs of vacuum-tube oscillation generators and adapted to be energized thereby.

32. In a wireless transmission system, the combination with a symmetrical polyphase power source, of a plurality of pairs of oscillation generators, one pair for each phase, the oscillation generators of each pair being oppositely connected to the respective phases, and a common circuit energized by all said oscillation-generators, whereby a uniform sustained oscillating current is produced in said common circuit.

In testimony whereof I have hereunto affixed my signature this 30th day of April, 1921.

THOMAS APPLEBY.